US010845567B2

(12) United States Patent
Shin et al.

(10) Patent No.: US 10,845,567 B2
(45) Date of Patent: *Nov. 24, 2020

(54) LENS DRIVING DEVICE, CAMERA MODULE AND OPTICAL APPARATUS

(71) Applicant: LG INNOTEK CO., LTD., Seoul (KR)

(72) Inventors: Seung Taek Shin, Seoul (KR); Jin Suk Han, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/512,913

(22) Filed: Jul. 16, 2019

(65) Prior Publication Data
US 2019/0339481 A1 Nov. 7, 2019

Related U.S. Application Data

(63) Continuation of application No. 15/803,491, filed on Nov. 3, 2017, now Pat. No. 10,386,596, which is a (Continued)

(30) Foreign Application Priority Data

Aug. 18, 2015 (KR) .................. 10-2015-0116215

(51) Int. Cl.
G02B 7/09 (2006.01)
H04N 5/225 (2006.01)
(Continued)

(52) U.S. Cl.
CPC ................ G02B 7/09 (2013.01); G02B 7/08 (2013.01); G03B 3/10 (2013.01); H04N 5/2253 (2013.01);
(Continued)

(58) Field of Classification Search
None
See application file for complete search history.

(56) References Cited

U.S. PATENT DOCUMENTS 8,077,398 B2  12/2011 Osaka et al.
8,319,886 B1  11/2012 Wang et al.
(Continued)

FOREIGN PATENT DOCUMENTS

CN         102347679 A    2/2012
CN         103163621 A    8/2013
WO   WO 2015/102382 A1   7/2015

Primary Examiner — Cynthia Segura
(74) Attorney, Agent, or Firm — Birch, Stewart, Kolasch & Birch LLP

(57) ABSTRACT

A lens driving device is provided, the lens driving device including a housing including a through hole; a bobbin accommodated at the through hole; a magnet disposed on the housing; a first coil disposed on the bobbin and facing the magnet; a first support member coupled to the housing and the bobbin, and movably supporting the bobbin in a direction of an optical axis; a protrusion part outwardly protruded from an outer lateral surface of the bobbin; and a groove part on the housing at a position corresponding with the protrusion part and accommodating at least a portion of the protrusion part, wherein an outer lateral surface of the protrusion part includes a first surface, a second surface and a third surface disposed between the first surface and the second surface, wherein each of the first surface, the second surface and the third surface is parallel with an inner lateral surface of the groove part, and wherein an angle between the first surface and the third surface, and an angle between the second surface and the third surface are an obtuse angle.

20 Claims, 6 Drawing Sheets

Related U.S. Application Data continuation of application No. 15/234,275, filed on Aug. 11, 2016, now Pat. No. 9,829,673.

(51) Int. Cl.
    *G03B 3/10*     (2006.01)
    *G02B 7/08*     (2006.01)

(52) U.S. Cl.
    CPC ........... *G03B 2205/0007* (2013.01); *G03B 2205/0069* (2013.01); *H04N 5/2254* (2013.01)

(56) References Cited

U.S. PATENT DOCUMENTS

| | | | |
|---|---|---|---|
| 8,638,510 B2* | 1/2014 | Lee | H02K 5/04 |
| | | | 359/824 |
| 8,836,177 B2 | 9/2014 | Lee et al. | |
| 8,912,690 B2* | 12/2014 | Kim | G02B 7/08 |
| | | | 310/12.16 |
| 9,046,640 B2* | 6/2015 | Min | G02B 7/026 |
| 9,190,891 B2* | 11/2015 | Lee | H02K 41/0356 |
| 9,195,026 B1 | 11/2015 | Chen et al. | |
| 9,360,655 B2 | 6/2016 | Uno et al. | |
| 9,451,167 B2 | 9/2016 | Lee | |
| 9,554,023 B2 | 1/2017 | Park | |
| 9,575,329 B2 | 2/2017 | Kim et al. | |
| 9,720,204 B2 | 8/2017 | Yoo et al. | |
| 9,781,322 B2* | 10/2017 | Cho | H04N 5/2257 |
| 9,829,673 B2* | 11/2017 | Shin | G02B 7/09 |
| 9,933,628 B2 | 4/2018 | Ariji | |
| 10,048,569 B2* | 8/2018 | Lee | G02B 7/08 |
| 2006/0002275 A1 | 1/2006 | Huang et al. | |
| 2008/0068728 A1 | 3/2008 | Westerweck et al. | |
| 2008/0259468 A1 | 10/2008 | Chung | |
| 2009/0109330 A1* | 4/2009 | Nakano | G02B 7/08 |
| | | | 348/374 |
| 2009/0185299 A1 | 7/2009 | Oya | |
| 2010/0002317 A1 | 1/2010 | Osaka et al. | |
| 2010/0046935 A1 | 2/2010 | Horidan et al. | |
| 2010/0133923 A1 | 6/2010 | Liao et al. | |
| 2010/0208369 A1 | 8/2010 | Shin | |
| 2011/0163616 A1 | 7/2011 | Kwon | |
| 2011/0181740 A1 | 7/2011 | Watanabe et al. | |
| 2012/0008220 A1* | 1/2012 | Lee | G03B 3/10 |
| | | | 359/822 |
| 2012/0025633 A1* | 2/2012 | Lee | H02K 41/0356 |
| | | | 310/12.16 |
| 2012/0146432 A1* | 6/2012 | Kim | G02B 7/08 |
| | | | 310/12.16 |
| 2012/0200176 A1 | 8/2012 | Park | |
| 2013/0170052 A1 | 7/2013 | Yu | |
| 2014/0009006 A1* | 1/2014 | Lee | H02K 41/0356 |
| | | | 310/12.16 |
| 2014/0092494 A1* | 4/2014 | Min | G03B 3/10 |
| | | | 359/824 |
| 2014/0355145 A1 | 12/2014 | Park et al. | |
| 2014/0362242 A1 | 12/2014 | Takizawa | |
| 2015/0192756 A1 | 7/2015 | Uno et al. | |
| 2015/0212291 A1 | 7/2015 | Lee | |
| 2015/0253583 A1* | 9/2015 | Cho | H04N 5/23287 |
| | | | 348/360 |
| 2016/0048033 A1 | 2/2016 | Kim et al. | |
| 2016/0109719 A1* | 4/2016 | Cho | G03B 3/10 |
| | | | 359/557 |
| 2016/0195794 A1 | 7/2016 | Zhao et al. | |
| 2016/0209621 A1 | 7/2016 | Park et al. | |
| 2016/0216531 A1 | 7/2016 | Park et al. | |
| 2016/0320585 A1 | 11/2016 | Park et al. | |
| 2016/0323487 A1* | 11/2016 | Lee | G02B 27/646 |
| 2017/0090148 A1 | 3/2017 | Park | |
| 2017/0142307 A1 | 5/2017 | Kim | |
| 2018/0059358 A1* | 3/2018 | Shin | G02B 7/09 |
| 2018/0188527 A1 | 7/2018 | Hu et al. | |
| 2018/0239164 A1* | 8/2018 | Park | H04N 5/2254 |
| 2019/0107687 A1* | 4/2019 | Min | G03B 17/02 |
| 2019/0204616 A1* | 7/2019 | Yeo | H02K 41/0356 |
| 2019/0306393 A1* | 10/2019 | Cho | H04N 5/2257 |
| 2019/0384034 A1* | 12/2019 | Min | G02B 7/09 |

\* cited by examiner (a)

(b)

(a)

(b)

LENS DRIVING DEVICE, CAMERA MODULE AND OPTICAL APPARATUS

This application is a Continuation of U.S. copending application Ser. No. 15/803,491, filed on Nov. 3, 2017, which is a Continuation of U.S. application Ser. No. 15/234,275, filed on Aug. 11, 2016 (U.S. Pat. No. 9,829,673, Issued on Nov. 28, 2017), which claims priority under 35 U.S.C. § 119(a) to Korean Patent Application No. 10-2015-0116215, filed on Aug. 18, 2015, all of which are hereby expressly incorporated by reference into the present application

TECHNICAL FIELD

Exemplary embodiments of the present disclosure relate to a lens driving device, a camera module, and an optical apparatus.

BACKGROUND

The technology described in this section is merely intended to provide background information of an exemplary embodiment of the present disclosure, and does not mean the prior art.

Concomitant with wide propagation of various mobile terminals and commercialization of wireless Internet services, demands by consumers on the mobile terminals are diversified, and various types of additional equipment are attached to the mobile terminals.

Among the various types of additional equipment, a camera module may be a representative device capable of editing and transmitting a still image or a moving picture, as necessary, by photographing the still image or the moving picture, and storing the still image or the moving picture in image data.

Recently, a camera module having an auto focus function is being used. Here, as an exemplary embodiment of performing the auto focus function, a bobbin fixed with a lens module may be moved closer to or far from an image sensor, such that the image sensor can obtain a clear image of the subject.

However, in the conventional camera modules, the stopper limiting the moving range of the bobbin may disproportionately limit the moving range in one direction and another direction. Thereby, there may be caused a problem in that a big impact is imposed on the bobbin depending on a direction of the external impact.

In addition, the conventional camera module has a problem in that a big impact is imposed on the bobbin because the speed is fast when a tilt is induced in the bobbin.

SUMMARY

In order to solve the foregoing problems of the conventional art, a lens driving device is provided herein, wherein the moving range of the bobbin is minimized in both of one direction and another direction. In particular, a lens driving device is provided wherein a moving range of the bobbin is correspondently limited in an x-axis direction, a y-axis direction, and an diagonal direction (between the x-axis and the y-axis).

In addition, a lens driving device is provided wherein a tiltable angle is decreased such that the speed of the bobbin striking a cover member when the bobbin is tilted.

A camera module and an optical apparatus including the lens driving device are provided.

In order to achieve at least the above objects, in whole or in part, and in accordance with the purposes of the present disclosure, as embodied and broadly described, and in a general aspect, there is provided a lens driving device, comprising: a housing comprising a through hole; a bobbin accommodated at the through hole; a magnet disposed on the housing; a first coil disposed on the bobbin and facing the magnet; a first support member coupled to the housing and the bobbin, and movably supporting the bobbin in a direction of an optical axis; a protrusion part outwardly protruded from an outer lateral surface of the bobbin; and a groove part on the housing at a position corresponding with the protrusion part and accommodating at least a portion of the protrusion part, wherein an outer lateral surface of the protrusion part comprises a first surface, a second surface and a third surface disposed between the first surface and the second surface, wherein each of the first surface, the second surface and the third surface is parallel with an inner lateral surface of the groove part, and wherein an angle between the first surface and the third surface, and an angle between the second surface and the third surface are an obtuse angle.

In some exemplary embodiments, the groove part may comprise a first facing surface facing the first surface, a second facing surface facing the second surface, and a third facing surface facing the third surface, and an angle formed by the first facing surface and the third facing surface and an angle formed by the second facing surface and the third facing surface may be an obtuse angle.

In some exemplary embodiments, a distance from each of the first surface, the second surface, and the third surface, to the inner lateral surface of the groove part may be 70~90 µm.

In some exemplary embodiments, the protrusion parts may be provided in a number of four, and the four protrusion parts may be symmetrically arranged based on a center of the bobbin.

In some exemplary embodiments, the housing may comprise a first lateral surface, a second lateral surface facing the first lateral surface, and a corner part that is a part where the first lateral surface and the second lateral surface, and the protrusion part may be formed at a position corresponding to that of the corner part of the housing.

In some exemplary embodiments, the angle between the first surface and the third surface may be 135°.

In some exemplary embodiments, the angle between the first surface and the third surface may be identical to the angle between the second surface and the third surface.

In some exemplary embodiments, an angle between a first virtual surface formed by the first surface being extended and a second virtual surface formed by the second surface being extended may be 90°.

In some exemplary embodiments, the groove part may comprise a first facing surface facing the first surface, a second facing surface facing the second surface, and a third facing surface facing the third surface, and a distance between the first surface and the first facing surface, a distance between the second surface and the second facing surface, and a distance between the third surface and the third facing surface may be identical.

In some exemplary embodiments, the first support member may comprise an inner part coupled to the bobbin, an outer part coupled to the housing, and a connecting part connecting the inner part and the outer part, and a portion of an upper surface of the protrusion part corresponding to a position of the connecting part may comprise an inclined surface.

In some exemplary embodiments, the inclined surface may have a shape for preventing an interference with the connecting part.

In some exemplary embodiments, the connecting part may not overlap with the protrusion part in an optical axis direction.

In some exemplary embodiments, at least a portion of the protrusion part may overlap with the housing in an optical axis direction.

In some exemplary embodiments, the lens driving device may further comprise an upper stopper extending upward from the protrusion part, wherein at least a portion of the upper stopper may overlap with a cover member internally accommodating the housing in an optical axis direction.

In some exemplary embodiments, the lens driving device may further comprise: a base arranged at a lower side of the housing; a second coil arranged at the base and facing the magnet; and a second support member coupled to the housing and the base, and movably supporting the housing in a direction perpendicular to an optical axis.

In another general aspect, a lens driving device is provided, comprising: a housing comprising a through hole; a bobbin accommodated at the through hole; a magnet disposed on the housing; a first coil disposed on the bobbin and facing the magnet; a first support member coupled to the housing and the bobbin, and movably supporting the bobbin in a direction of an optical axis; a stopper formed on the bobbin; and a stopper accommodation part formed on the housing and contacting the stopper by movement of the bobbin to limit the movement of the bobbin, wherein the stopper and the stopper accommodation part may limit a moving range of the bobbin in an x-axis direction perpendicular to the optical axis, a y-axis direction and a diagonal direction to an equal distance, and wherein the diagonal direction may form 45° with the x-axis direction and the y-axis direction.

In some exemplary embodiments, the stopper may be protruded from an outer lateral surface of the bobbin, and the stopper accommodation part may be recessed downward from an upper surface of the housing.

In some exemplary embodiments, the stopper accommodation part may be formed concavely downward from an upper surface of the housing.

In still another general aspect, there is provided a camera module, the camera module comprising: a lens driving device; a lens module accommodated in the bobbin of the lens driving device; and a printed circuit board mounted with an image sensor and arranged with the lens driving device. The lens driving device may comprise: a housing comprising a through hole; a bobbin accommodated at the through hole; a magnet disposed on the housing; a first coil disposed on the bobbin and facing the magnet; a first support member coupled to the housing and the bobbin, and movably supporting the bobbin in a direction of an optical axis; a protrusion part outwardly protruded from an outer lateral surface of the bobbin; and a groove part on the housing at a position corresponding with the protrusion part and accommodating at least a portion of the protrusion part, wherein an outer lateral surface of the protrusion part comprises a first surface, a second surface and a third surface disposed between the first surface and the second surface, wherein each of the first surface, the second surface and the third surface is parallel with an inner lateral surface of the groove part, and wherein an angle between the first surface and the third surface, and an angle between the second surface and the third surface are an obtuse angle.

In still another general aspect, there is provided an optical apparatus, comprising: a main body; a camera module, wherein the camera module is arranged at the main body and configured to photograph an image of a subject; and a display unit arranged at a surface of the main body and configured to output an image photographed by the camera module. The camera module may comprise: a lens driving device; a lens module accommodated in the bobbin of the lens driving device; and a printed circuit board mounted with an image sensor and arranged with the lens driving device. The lens driving device may comprise: a housing comprising a through hole; a bobbin accommodated at the through hole; a magnet disposed on the housing; a first coil disposed on the bobbin and facing the magnet; a first support member coupled to the housing and the bobbin, and movably supporting the bobbin in a direction of an optical axis; a protrusion part outwardly protruded from an outer lateral surface of the bobbin; and a groove part on the housing at a position corresponding with the protrusion part and accommodating at least a portion of the protrusion part, wherein an outer lateral surface of the protrusion part comprises a first surface, a second surface and a third surface disposed between the first surface and the second surface, wherein each of the first surface, the second surface and the third surface is parallel with an inner lateral surface of the groove part, and wherein an angle between the first surface and the third surface, and an angle between the second surface and the third surface are an obtuse angle.

In still another general aspect, there is provided a lens driving device, the lens driving device comprising: a housing supporting a magnet; a bobbin movably arranged at an inside of the housing; a first coil arranged at an outer circumferential surface of the bobbin, and facing the magnet; a base arranged between the base and the housing to face the magnet; an elastic member coupled at an upper part or a lower part to support the bobbin; and a lateral support member coupled to the housing and the base, wherein the bobbin may comprise a protrusion part formed protrusively from an outer lateral surface, the housing may comprise a groove part corresponding to the protrusion part, the protrusion part may comprise a first surface, a second surface, and a third surface disposed between the first surface and the second surface, each of the first surface, the second surface, and the third surface may be parallel to an inner surface of the groove part, and an angle formed by the first surface and the third surface and an angle formed by the second surface and the third surface may be an obtuse angle.

In some exemplary embodiments, the stopper accommodation part may comprise a first facing surface facing the first surface, a second facing surface facing the second surface, and a third facing surface facing the third surface, and wherein an angle formed by the first facing surface and the third facing surface and an angle formed by the second facing surface and the third facing surface may be an obtuse angle.

In some exemplary embodiments, a distance from each of the first surface, the second surface, and the third surface, to the inner lateral surface of the stopper accommodation part may be 70~90 μm.

In some exemplary embodiments, the stopper may be provided in a number of four, and the four stoppers may be symmetrically arranged based on a center of the bobbin.

In some exemplary embodiments, the housing may comprise a first lateral surface, a second lateral surface facing the first lateral surface, and a corner part that is a part where the first lateral surface and the second lateral surface, and wherein the protrusion part may be formed at a position corresponding to that of the corner part of the housing.

In some exemplary embodiments, the angle between the first surface and the third surface may be 135°.

In some exemplary embodiments, the angle between the first surface and the third surface may correspond to the angle between the second surface and the third surface.

In some exemplary embodiments, an angle between a first virtual surface formed by the first surface being extended and a second virtual surface formed by the second surface being extended is 90°.

In some exemplary embodiments, the stopper accommodation part may comprise a first facing surface facing the first surface, a second facing surface facing the second surface, and a third facing surface facing the third surface, and wherein a distance between the first surface and the first facing surface, a distance between the second surface and the second facing surface, and a distance between the third surface and the third facing surface may correspond to one another.

In some exemplary embodiments, the elastic member may comprise an inner part coupled to the bobbin, an outer part coupled to the housing, and a connecting part connecting the inner part and the outer part, wherein a portion of an upper surface corresponding to a position of the connecting part may include an inclined surface.

In some exemplary embodiments, the inclined surface may have a shape for preventing an interference with the connecting part.

In some exemplary embodiments, the connecting part may not overlap with the protrusion part in a rostro caudal direction.

In some exemplary embodiments, at least a portion of the protrusion part may overlap with the housing in a rostro caudal direction.

In some exemplary embodiments, the lens driving device may further comprise an upper stopper extended upwardly from the protrusion part, and at least a portion of the upper stopper may overlap with a cover member internally accommodating the housing in a rostro caudal direction.

In still another general aspect, a lens driving device is provided, the lens driving device comprising: a housing; a bobbin internally accommodating a lens module, and coupled to an inner side of the housing; a stopper disposed at the bobbin; and a stopper accommodation part disposed at the housing, and contacting the stopper by movement of the bobbin to limit the movable distance of the bobbin with respect to the housing, wherein a movable distance of the bobbin is limited to correspond to at least three directions perpendicular to an optical axis direction of the lens module, and the at least three directions may comprise an x-axis direction perpendicular to a z-axis direction (optical axis direction), a y-axis direction perpendicular to the z-axis direction and the x-axis direction, and a diagonal direction perpendicular to the z-axis direction and forming an acute angle with the x-axis direction and the y-axis direction.

In some exemplary embodiments, an acute angle formed by the x-axis direction and the diagonal direction may be 45°.

In some exemplary embodiments, the stopper accommodation part may limit a lower limit of movement of the bobbin with respect to the housing in an optical axis direction.

In some exemplary embodiments, the stopper may be disposed to be outwardly protruded from an outer lateral surface of the bobbin, and the stopper accommodation part may be disposed at an upper surface of the housing.

In some exemplary embodiments, the stopper accommodation part may be formed concavely from an upper surface of the housing to a lower side.

In still another general aspect, there is provided a camera module, comprising: a housing supporting a magnet; a bobbin movably arranged in the housing; a first coil arranged on an outer circumferential surface of the bobbin and facing the magnet; a base arranged an a lower part of the housing by being spaced apart from the housing; a second coil arranged between the base and the housing to face the magnet; an elastic member coupled to an upper part or a lower part of the housing to support the bobbin; and a lateral support member coupled to the housing and the base, wherein the bobbin may comprise a protrusion part protruded from an outer surface, and the housing may comprise a groove part corresponding to the protrusion part, wherein the protrusion part may comprise a first surface, a second surface, and a third surface disposed between the first surface and the second surface, wherein each of the first surface, the second surface, and the third surface may be parallel to an inner lateral surface of the groove part, and wherein an angle formed by the first surface and the third surface and an angle formed by the second surface and the third surface may be an obtuse angle.

In still another general aspect, there is provided an optical apparatus, comprising: a main body, a display unit displaying information by being arranged at a surface of the main body, and a camera module configured to photograph a picture or an image by being installed at the main body, wherein the camera module comprising: a housing supporting a magnet; a bobbin movably arranged in the housing; a first coil arranged on an outer circumferential surface of the bobbin and facing the magnet; a base arranged an a lower part of the housing by being spaced apart from the housing; a second coil arranged between the base and the housing to face the magnet; an elastic member coupled to an upper part or a lower part of the housing to support the bobbin; and a lateral support member coupled to the housing and the base, wherein the bobbin may comprise a protrusion part protruded from an outer surface, and the housing may comprise a groove part corresponding to the protrusion part, wherein the protrusion part may comprise a first surface, a second surface, and a third surface disposed between the first surface and the second surface, wherein each of the first surface, the second surface, and the third surface may be parallel to an inner lateral surface of the groove part, and wherein an angle formed by the first surface and the third surface and an angle formed by the second surface and the third surface may be an obtuse angle.

According to an exemplary embodiment of the present disclosure, the impact imposed to the bobbin and peripheral components may be minimized even when the bobbin strikes the peripheral components by external impacts. Thereby, the mechanical reliability of the device may be obtained.

BRIEF DESCRIPTION OF DRAWINGS

FIG. 5 illustrates a case that a bobbin is disposed at a regular position with respect to a cover member, and FIG. 6 illustrates a case that a bobbin is tiled with respect to the cover member to cause a strike on the cover member by the bobbin.

DETAILED DESCRIPTION

Figure 1:
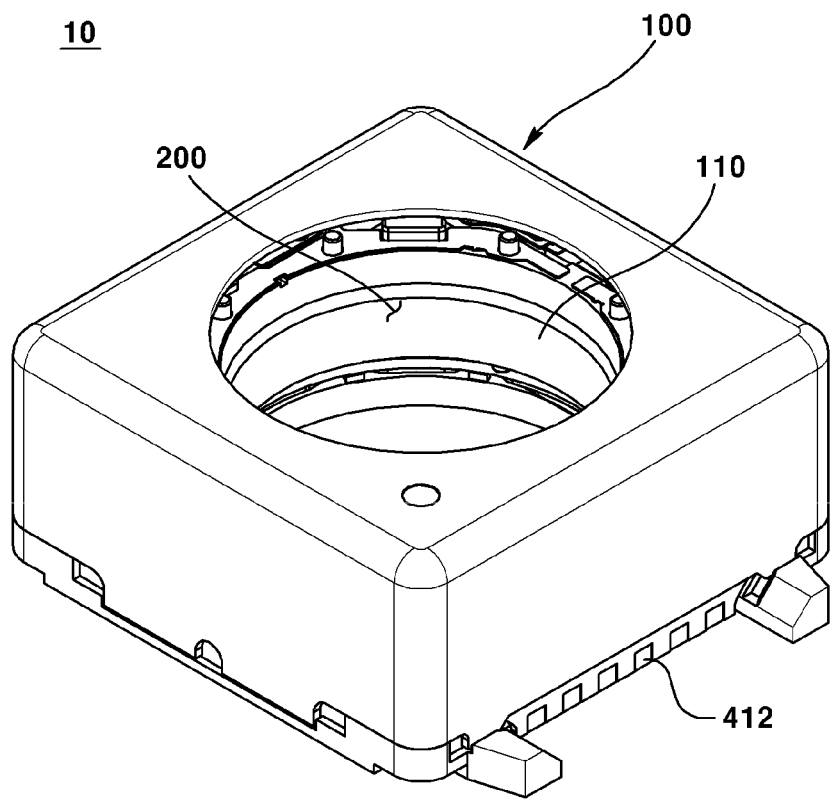
FIG. 1 is a perspective view illustrating a lens driving device according to an exemplary embodiment of the present disclosure.

Hereinafter, exemplary embodiments of the present disclosure will be described with reference to the exemplary drawings. In designating elements in the drawings as reference numerals, wherever possible, the same reference numerals are used to refer to the same element, even though the same elements are illustrated in different drawings. In addition, in describing exemplary embodiments of the present disclosure, when it is determined that a detailed description about known function or structure relating to the present disclosure may disturb understanding of exemplary embodiments of the present disclosure, the detailed description may be omitted.

In addition, in describing elements of exemplary embodiments of the present disclosure, the terms such as "first", "second" "A", "B", "(a)" and "(b)" may be used. However, such terms are used merely to distinguish a particular element from another element, and therefore, essence, order or sequence of the relevant elements shall not be limited by the terms. It will be understood that when an element is referred to as being "connected", "contacted" or "coupled" to another element, it can be directly connected, contacted or coupled to the other elements, or otherwise, an intervening elements may be "connected", "contacted" or "coupled" between the element and the other element.

As used herein, the term "optical axis direction" is defined as a direction of an optical axis of a lens module installed at a lens driving device. Meanwhile, the term "optical axis direction" may be used in combination with the terms such as "upward/downward direction", "z-axis direction", etc.

As used herein, the term "auto focus function" is defined as a function to focus on the subject by moving the lens module in the optical axis direction according to distance to the subject to adjust the distance between an image sensor and the subject, in order to form a clear image on the image sensor. Meanwhile, the term "auto focus" may be used in combination with the term "AF (Auto Focus)".

As used herein, the term "handshake compensation function" is defined as a function to move or tilt the camera module in a direction perpendicular to the optical axis direction so as to counterbalance trembling (motion) generated by the image sensor due to external force. Meanwhile, the term "handshake compensation" may be used in combination with the term "OIS (Optical Image Stabilization)".

Hereinafter, any one of a lower stopper (810) and an upper stopper (820) may be referred to as a "first stopper", and another one may be referred to as a "second stopper".

Hereinafter, any one of an upper support member (610), a lower support member (620) and a lateral support member (630) may be referred to as a "first support member". Another one may be referred to as a "second support member", and the last one may be referred to as a "third support member".

Hereinafter, a first driving part (220) may be a coil, a second driving part (320) may be a magnet, and a third driving part (420) may be a coil. Here, in order to distinguish the coil of the first driving part (220) from the coil of the third driving part (420), any one of the two may be referred to as a "first coil" and another one may be referred to as a "second coil".

Hereinafter, a structure of an optical apparatus according to an exemplary embodiment of the present disclosure will be described.

Hereinafter, the lower stopper (810) may be referred to as a "stopper", and the lower stopper accommodation part (820) may be referred to as a "stopper accommodation part". In addition, the lower stopper (810) may be referred to as a "protrusion part", and the lower stopper accommodation part (820) may be referred to as a "groove part".

An optical apparatus according to an exemplary embodiment of the present disclosure may be any one of a mobile phone, a smart phone, a portable smart device, a digital camera, a laptop computer, a digital broadcasting device, a PDA (Personal Digital Assistant), a PMP (Portable Multimedia Player), and a navigation device, but not limited hereto. Thus, any kind of device to photograph a picture or motion picture may be the optical apparatus.

According to an exemplary embodiment of the present disclosure, the optical apparatus may comprise a main body (not illustrated), a display unit (not illustrated) configured to display information by being installed at the main body, and a camera (not illustrated) configured to photograph a picture or an image by being installed at the main body.

Hereinafter, a structure of the camera module will be described.

The camera module may further comprise a lens driving device (10), a lens module (not illustrated), an infrared-cutoff filter (not illustrated), a printed circuit board (not illustrated), an image sensor (not illustrated), and a controller (not illustrated).

The lens module may comprise at least one lens (not illustrated), and a lens barrel accommodating at least one lens. However, a structure of the lens module is not limited to the lens barrel. Thus, any holder structure which is able to support a lens may be employed. The lens module may move along with the lens driving device (10) by being coupled to the lens driving device (10). As an example, the lens module may be screw-coupled to the lens driving device (10). As an example, the lens module may be coupled with the lens driving device (10) via an adhesive (not illustrated). Meanwhile, the light that has passed through the lens module may be irradiated to the image sensor.

The infrared cut-off filter may block light in an infrared area from being incident on the image sensor. As an example, the infrared cut-off filter may be disposed between the lens module and the image sensor. The infrared cut-off filter may be installed at a holder member (not illustrated) provided independently of a base (500). The infrared cut-off filter may be installed at a penetration hole (510) formed on a center portion of the base (500). As an example, the infrared cut-off filter may be formed of a film material or a glass material. Meanwhile, as an example, the infrared cut-off filter may be formed by a process where a kind of infrared cut-off coating material is coated on a flat optical filter such as a cover glass for image plane protection.

The printed circuit board may support the lens driving device (10). An image sensor may be mounted at the printed circuit board. As an example, the image sensor may be disposed at an inside of an upper surface of the printed circuit board, and a sensor holder (not illustrated) may be disposed at an outside of an upper surface of the printed circuit board. Alternatively, the image sensor may be disposed at an inside of an upper surface of the printed circuit board, and the lens driving device (10) may be disposed at an outside of an upper surface of the printed circuit board. Through such structure, the light that has passed through the lens module accommodated inside of the lens driving device (10) may be irradiated to the image sensor mounted at the printed circuit board. Meanwhile, a controller configured to control the lens driving device (10) may be disposed at the printed circuit board.

The image sensor may be mounted on the printed circuit board. The image sensor may be disposed to have the same optical axis with that of the lens module. Through such structure, the image sensor may obtain the light that has passed through the lens module. The image sensor may output the irradiated light as a picture. As an example, the image sensor may be any one of a CCD (charge coupled device), an MOS (metal oxide semi-conductor), a CPD (charge priming device) and a CID (charge injection device), but not limited hereto.

The controller may be mounted at the printed circuit board. The controller may be disposed outside of the lens driving device (10). Alternatively, the controller may be disposed inside of the lens driving device (10). The controller may be disposed at an outside of the lens driving device (10). Alternatively, the controller may be disposed at an inside of the lens driving device (10). The controller may control direction, intensity and amplitude of current supplied to each of components composing the lens driving device (10). The lens may perform at least one of auto focus function and handshake compensation function by controlling the lens driving device (10). That is, the controller may control the lens driving device (10) to move the lens module in an optical axis direction or in a direction perpendicular to the optical axis direction, or may tilt the lens module. Furthermore, the controller may perform feedback control of the auto focus and handshake compensation functions. More particularly, the controller may control electric power or current applied to the first driving part (220) through the third driving part (420) by receiving a position of a bobbin (210) or housing (310) detected by a sensor part (not illustrated).

Hereinafter, a structure of the lens driving device (10) will be described with reference to the drawings.

Figure 2:
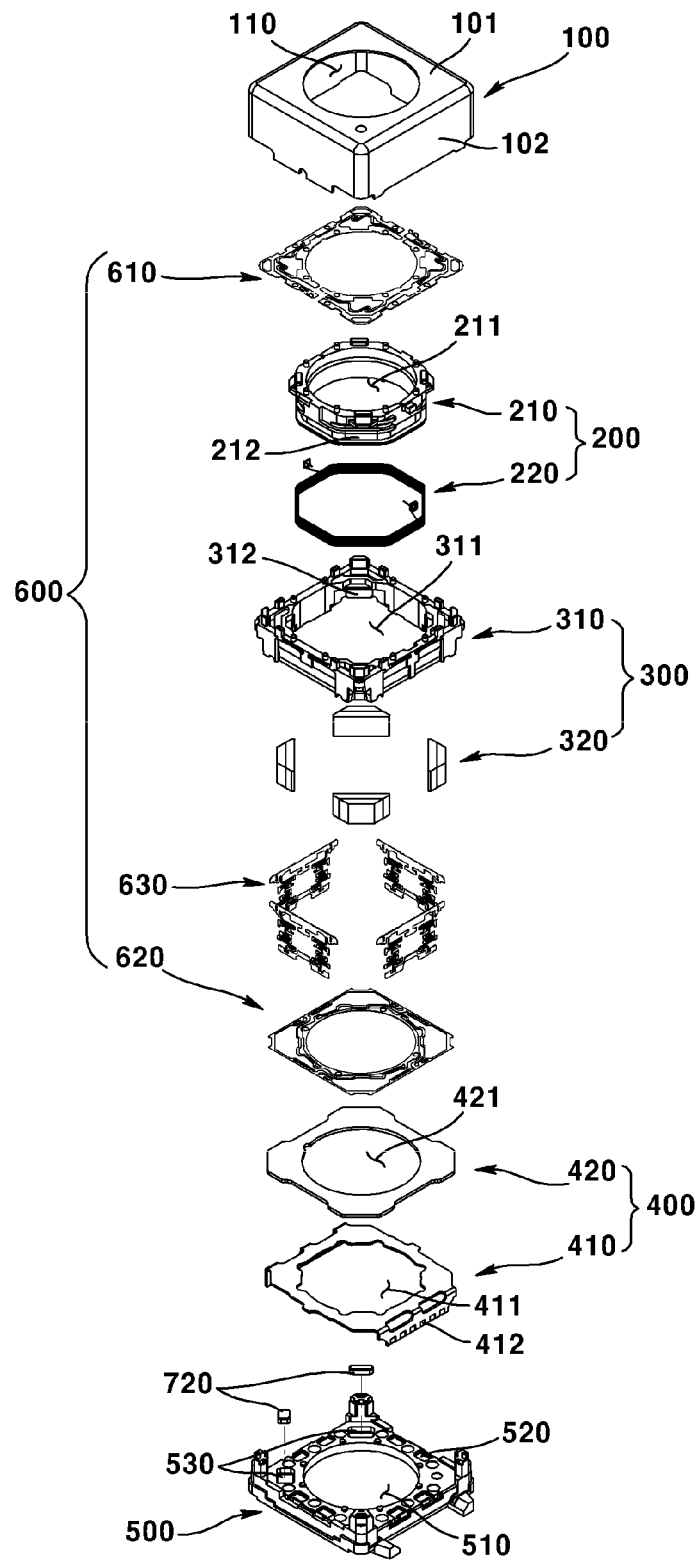
FIG. 2 is an exploded perspective view illustrating a lens driving device according to an exemplary embodiment of the present disclosure.
Figure 3:
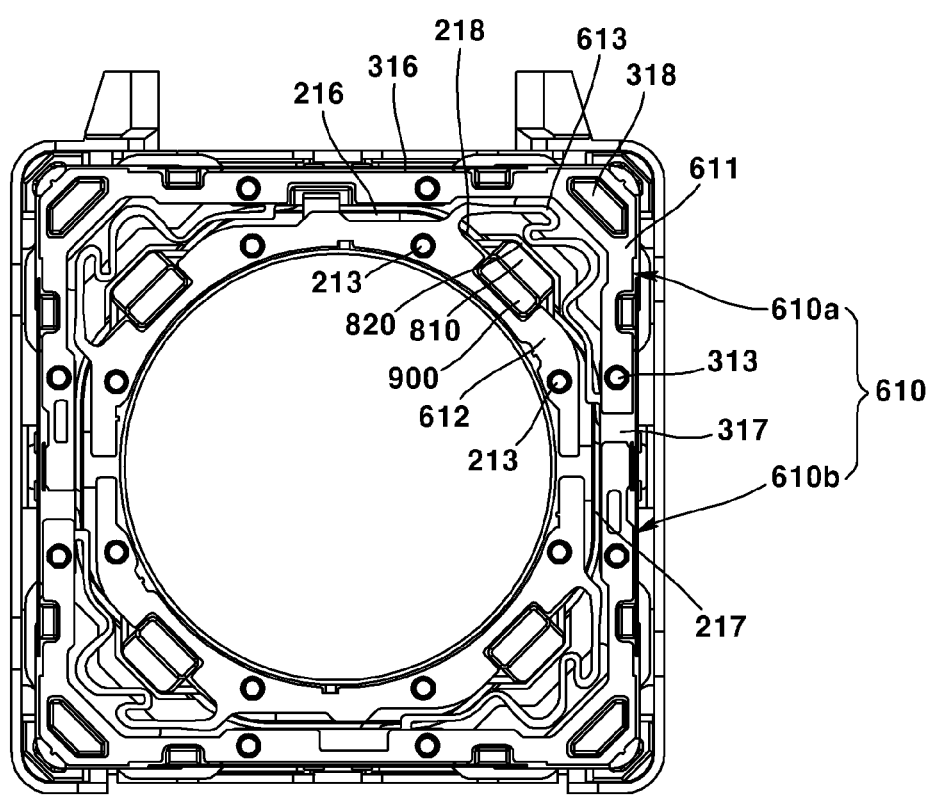
FIG. 3 is a plan view illustrating a portion of a lens driving device according to an exemplary embodiment of the present disclosure.
Figure 4:
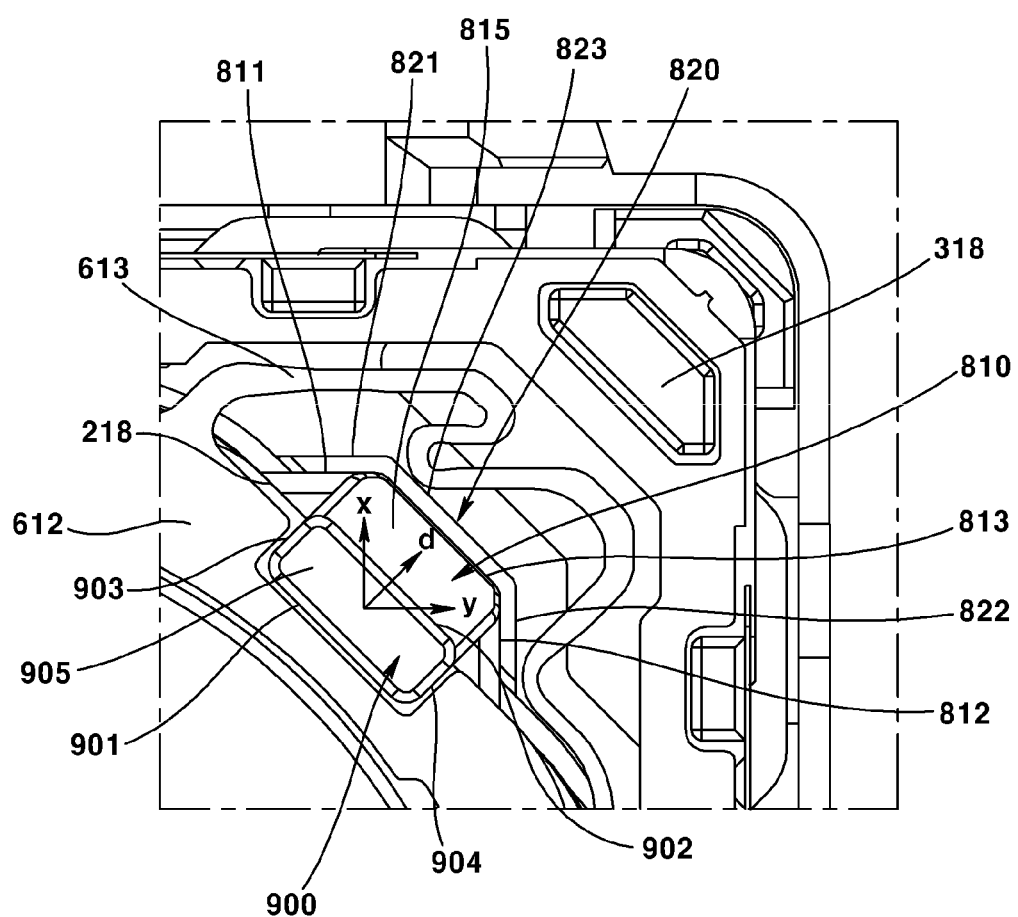
FIG. 4 is a partial enlarged view illustrating by enlarging a portion of FIG. 3.

FIG. 1 is a perspective view illustrating a lens driving device according to an exemplary embodiment of the present disclosure; FIG. 2 is an exploded perspective view illustrating a lens driving device according to an exemplary embodiment of the present disclosure; FIG. 3 is a plan view illustrating a portion of a lens driving device according to an exemplary embodiment of the present disclosure; and FIG. 4 is a partial enlarged view illustrating by enlarging a portion of FIG. 3.

Referring to FIGS. 1 through 4, the lens driving device (10) may comprise a cover member (100), a first mover (200), a second mover (300), a stator (400), a base (500), a support member (600), and a sensor part (not illustrated). However, at least any one of the cover member (100), the first mover (200), the second mover (300), the stator (400), the base (500), the support member (600), and the sensor part may be omitted. In particular, the sensor part is a configuration for auto focus feedback function and/or handshake compensation feedback function, and therefore may be omitted.

The cover member (100) may form an external appearance of the lens driving device (10). The cover member (100) may be formed in a shape of a hexahedron of which lower part is opened, but not limited hereto. The cover member (100) may comprise an upper plate (101) and a lateral plate (102) extended from an outer side of the upper plate (101) to a lower side. Meanwhile, a lower end of the lateral plate (102) of the cover member (100) may be mounted on the base (500). The first mover (200), the second mover (300), the stator (400) and the support member (600) may be disposed in an internal space formed by the base (500) and the cover member (100). In addition, the cover member (100) may be mounted on the base (500) where an inner lateral surface of the cover member (100) adheres to a part or a whole of a lateral surface of the base (500). Through such structure, the cover member (100) may protect internal components from external impacts as well as prevent penetration of external pollutants.

As an example, the cover member (100) may be formed of a metallic material. In particular, the cover member (100) may be provided as a metallic plate. In this case, the cover member (100) may protect external radio wave interferences. That is, the cover member (100) may block radio wave generated outside of the lens driving device (10) from being introduced inside of the cover member (100). In addition, the cover member (100) may block radio wave generated outside of the lens driving device (10) from being released outside of the cover member (100). However, the material of the cover member (100) is not limited hereto.

The cover member (100) may comprise an opening (110) formed on the upper plate (101) to expose the lens module. The opening (110) may be provided in a shape corresponding to the lens module. A size of the opening (110) may be formed larger than a diameter of the lens module, such that the lens module can be assembled through the opening (110). In addition, the light introduced through the opening (110) may pass through the lens module. Meanwhile, the light that has passed through the lens module may be delivered to the image sensor.

The first mover (200) may be coupled to the lens module that is a component of the camera module (however, the lens module may be described as a component of the lens driving device (10)). The lens module may be disposed inside of the first mover (200). An outer circumferential surface of the lens module may be coupled to an inner circumferential surface of the first mover (200). Meanwhile, the first mover (200) may travel integrally with the lens module through interaction with the second mover (300). That is, the first mover (200) may move the lens module.

The first mover (200) may comprise a bobbin (210) and a first driving part (220). The first mover (200) may comprise the bobbin (210) coupled to the lens module. The first mover (200) may comprise a first driving part (220) being moved through interaction with the second driving part (320) by being disposed at the bobbin (210).

The bobbin (210) may be coupled to the lens module. In particular, an outer circumferential surface of the lens module may be coupled to an inner circumferential surface of the bobbin (210). In addition, a lower part of the bobbin (210) may be coupled to a lower support member (620), and an upper part of the bobbin (210) may be coupled to an upper support member (610). The bobbin (210) may travel relatively with respect to the housing (310) in an optical axis direction.

The bobbin (210) may comprise a lens coupling part (211) formed on an inner side of the bobbin (210). A lens module may be coupled to the lens coupling part (211). A lens module may be coupled to the lens coupling part (211). There may be formed a screw thread in a shape corresponding to that of the screw thread formed on an outer circumferential surface of the lens module. That is, an outer circumferential surface of the lens module may be coupled to an inner circumferential surface of the lens coupling part (211). Meanwhile, an adhesive may be introduced between the lens module and the bobbin (210). Here, the adhesive may be an epoxy hardened by ultraviolet (UV) rays. That is, the lens module and the bobbin (210) may be adhered by the ultraviolet-hardened epoxy. In addition, the lens module and the bobbin (210) may be adhered by heat-hardened epoxy.

The bobbin (210) may comprise a first driving part coupling part (212) on which the first driving part (220) is wound or mounted. A first driving part coupling part (212) may be formed integrally with an outer surface of the bobbin (210). In addition, the first driving part coupling part (212) may be formed continuously along an outer surface of the bobbin (210), or may be formed by being separated at a predetermined interval. The first driving part coupling part (212) may comprise a recessed part formed by a portion of an outer surface being recessed. The first driving part (220) may be disposed at the recessed part. Here, the first driving part (220) may be supported by the first driving part coupling part (212).

The bobbin (210) may comprise an upper coupling part (213) coupled to an upper support member (610). The upper coupling part (213) may be coupled to an inner part (612) of the upper support member (610). As an example, a protrusion (not illustrated) of the upper coupling part (213) may be coupled by being inserted in a groove or a hole (not illustrated) of the inner part (612). Meanwhile, a protrusion may be provided at the upper support member (610) and a groove or a hole may be provided at the bobbin (210), such that those two components may be coupled with each other. Meanwhile, the bobbin (210) may comprise a lower coupling part (not illustrated) coupled to the lower support member (620). The lower coupling part formed at a lower part of the bobbin (210) may be coupled to an inner part (622) of the lower support member (620). As an example, the protrusion (not illustrated) of the lower coupling part may be coupled by being inserted in a groove or a hole (not illustrated) of the inner part (612), such that those two components may be coupled with each other. As an example, the upper coupling part (213) may be provided in plural number.

Movement of the bobbin (210) may be limited by the lower stopper (810). When the bobbin (210) is moved in a downward direction, the lower stopper (810) may be accommodated in the lower stopper accommodation part (820) to limit movement of the bobbin (210) in the downward direction. Furthermore, the lower stopper (810) and the lower stopper accommodation part (820) may limit movable distance in an additional direction except for the downward direction. Here, the movable distance of the bobbin (210) may be limited to correspond to at least three directions perpendicular to the optical axis direction. In this case, the at least three directions may comprise an x-axis direction perpendicular to a z-axis direction (optical axis direction), a y-axis direction perpendicular to the x-axis direction and the z-axis direction, and a diagonal direction perpendicular to the z-axis direction and forming an acute angle with the x-axis direction and the y-axis direction. Here, the acute angle formed by the x-axis direction and the diagonal direction may be 45°.

Movement of the bobbin (210) may be limited by the lower stopper (810). When the bobbin (210) is moved in an upward direction or tilted, the upper stopper (810) may collide with the cover member (100), such that the movement of the bobbin (210) may be limited.

The bobbin (210) may comprise a first surface (216) facing a first lateral surface (316) of the housing (310), a second surface (217) facing a second lateral surface (317), and a third surface (218) disposed between the first surface (216) and the second surface (217). Here, the upper stopper (900) may be disposed on the third surface (218) of the bobbin (210). The first surface (216), the second surface (217), and the third surface (218) may be continuously disposed.

The first driving part (220) may be disposed facing to the second driving part (32) of the second mover (300). The first driving part (220) may move the bobbin (210) with respect to the housing (310) through electromagnetic interaction with the second driving part (320). The first driving part (220) may comprise a coil. The coil may be wound on an outer surface of the bobbin (210) by being guided by the first driving part coupling part (212). In addition, according to another exemplary embodiment of the present disclosure, four coils may be independently provided, such that two coils may be arranged on an outer surface of the bobbin (210) to form 90° with each other.

When the first driving part (220) comprises a coil, the electric power supplied to the coil may be supplied through the lower support member (620). Here, the lower support member (620) may be separately provided in a pair in order to supply electric power to the coil. Meanwhile, the first driving part (220) may comprise a pair of lead cables (not illustrated) for supplying electric power. In this case, each of the pair of lead cables may be electrically connected to a pair of lower support member (620), respectively. Alternatively, the first driving part (220) may be supplied with electric power from the upper support member (610). Meanwhile, when the electric power is supplied to the coil, an electromagnetic field may be formed around the coil. In another exemplary embodiment of the present disclosure, the first driving part (220) may comprise a magnet, and the second driving part (320) may comprise a coil.

The second mover (300) may be disposed at an outer side of the first mover (200) by facing the first mover (200). The second mover (300) may be supported by the base (500) disposed at a lower side. The second mover (300) may be supported by the fixing member. Here, the fixing member may comprise a base (500) and a stator (400). That is, the second mover (300) may be supported by the base (500) and/or the circuit board (410). The second mover (300) may be disposed in an internal space of the cover member (100).

The second mover (300) may comprise a housing (310) and a second driving part (320). The second mover (300) may comprise a housing (310) disposed at an outer side of the bobbin (210). In addition, the second mover (300) may comprise a second driving part (320) disposed facing the first driving part (220) and fixed at the housing (310).

At least a portion of the housing (310) may be formed in a shape corresponding to that of an inner surface of the cover member (100). In particular, an outer surface of the housing (310) may be formed in a shape corresponding to that of an inner surface of a lateral plate (102) of the cover member (100). An outer surface of the housing (310) and an inner surface of the lateral plate (102) of the cover member (100) may be evenly formed.

In particular, when the housing (310) is at an initial position, an outer surface of the housing (310) and an inner surface of the lateral plate (102) of the cover member (100) may be parallel to each other. In this case, when the housing (310) is moved toward the cover member (100) to a maximum extent, the outer surface of the housing (310) may surface-contact the inner surface of the lateral plate (102) of the cover member (100). Thereby, the impact applied on the housing (310) and/or the cover member (100) may be dispersed. As an example, the housing (310) may be in a shape of a hexahedron having four lateral surfaces. However, the housing (310) may take any shape that can be arranged in the cover member (100).

The housing (310) may be formed of an insulated material, and may be implemented as an injection molding material, in consideration of productivity. The housing (310) may be arranged to be spaced apart at a predetermined distance from the cover member (100), as a movable component for OIS (Optical Image Stabilization) operation. However, the housing (310) may be fixed on the base (500) in the AF (Auto Focus) model. Alternatively, in the AF model, the housing (310) may be omitted, and a magnet provided as the second driving part (320) may be fixed at the cover member (100).

An upper side and a lower side of the housing (310) may be opened to accommodate the first mover (200) movably in rostro-caudal direction. The housing (310) may internally comprise a through-hole (311) of which upper and lower portions are opened. The bobbin (210) may be movably disposed in the through-hole (311). That is, the through-hole (311) may be provided in a shape corresponding to that of the bobbin (210). In addition, an inner circumferential surface of the housing (310) forming the through-hole (311) may be disposed by being spaced apart from an outer circumferential surface of the bobbin (210).

The housing (310) may comprise a second driving part coupling part (312) formed in a shape corresponding to that of the second driving part (320) to accommodate the second driving part (320). That is, the second driving part coupling part (312) may accommodate and fix the second driving part (320). The second driving part (320) may be fixed to the second driving part coupling part (312) by an adhesive (not illustrated).

Meanwhile, the second driving part coupling part (312) may be disposed in an inner circumferential surface of the housing (310). In this case, it is advantageous for electromagnetic interaction with the first driving part (220) disposed inside of the second driving part (320). In addition, according to an exemplary embodiment of the present disclosure of the present disclosure, a lower portion of the second driving part coupling part (312) may be opened. In this case, it is advantageous for electromagnetic interaction between the third driving part (430) and the second driving part (420).

According to an exemplary embodiment of the present disclosure, a lower end of the second driving part (320) may be disposed to be protruded downward lower than a lower end of the housing (310). According to an exemplary embodiment of the present disclosure, the second driving part coupling part (312) may be provided in a number of four. Each of the second driving part coupling part (312) may be coupled to the second driving part (320).

An upper support member (610) may be coupled to an upper portion of the housing (310), and a lower support member (620) may be coupled to a lower portion of the housing (310). The housing (310) may comprise an upper coupling part (313) coupled to an upper support member (610). An upper coupling part (313) may be coupled to an outer part (611) of the upper support member (610). As an example, the protrusion of the upper coupling part (313) may be coupled by being inserted in a groove or hole (not illustrated) of the outer part (611). Meanwhile, in an alternative exemplary embodiment, the protrusion may be provided at the upper support member (610) and the groove or the hole may be provided on the housing (310), such that those two components can be coupled to each other.

Meanwhile, the housing (310) may comprise a lower coupling part (not illustrated) coupled to the lower support member (620). The lower coupling part formed on a lower portion of the housing (310) may be coupled to an outer part (621) of the lower support member (620). As an example, the protrusion of the lower coupling part may be coupled by being inserted in the groove or the hole of the outer part (621). Meanwhile, in an alternative exemplary embodiment, the protrusion may be provided at the lower support member (620) and the groove or the hole may be provided on the housing (310), such that those two components can be coupled to each other.

The housing (310) may comprise a first lateral surface, a second lateral surface facing the first lateral surface, and a corner part disposed between the first lateral surface and the second lateral surface. An upper stopper (not illustrated) may be disposed at a corner part of the housing (310). The upper stopper may be overlapped with the cover member (100) in a rostro-caudal direction. When the housing (310) is moved upward by external impacts, the upper stopper may contact the cover member (100) to limit movement of the housing (310) in an upward direction.

The housing (310) may comprise a first lateral surface (316), a second lateral surface (317), and a corner part (318) where the first lateral surface (316) meets the second lateral surface (317). The first lateral surface (316) may face the first surface (216) of the bobbin (210), the second lateral surface (317) may face the second surface (217) of the bobbin (210), and the corner part (318) may face the third surface (218) of the bobbin (210). Meanwhile, the first lateral surface (316) may face the first surface (811) of the lower stopper (810), the corner part (318) may face the third surface (813) of the lower stopper (810). As an example, the housing (310) may comprise four lateral surfaces and four corner parts disposed between the four lateral surfaces. Here, the upper stopper (900) may be disposed at each of the four corner parts.

The second driving part (320) may be disposed facing the first driving part (220) of the first mover (200). The second driving part (320) may move the first driving part (220) through electromagnetic interaction with the first driving part (220). The second driving part (320) may comprise a magnet. The magnet may be fixed at the second driving part coupling part (312) of the housing (310).

According to an exemplary embodiment of the present disclosure, as illustrated in FIG. 2, the second driving part (320) may comprise four independently provided magnets, such that two magnets may be arranged on the housing (310) to form 90° with each other. That is, the second driving part (320) may be mounted at four lateral surfaces of the housing (310) at a same interval, aiming to efficient use of internal volume. In addition, the second driving part (320) may adhere to the housing (310) using an adhesive, but not limited hereto. Meanwhile, the first driving part (220) may comprise a magnet, and the second driving part (320) may be provided as a coil.

The stator (400) may be disposed facing a lower side of the second mover (300). The stator (400) may movably support the second mover (300). The stator (400) may move the second mover (300). In addition, a through-hole (411, 421) corresponding to the lens module may be disposed at a center of the stator (400).

According to an exemplary embodiment of the present disclosure, the stator (400) may comprise a circuit board (410) and a third driving part (420). The stator (400) may comprise a circuit board (410) disposed between the third driving part (420) and the base (500). In addition, the stator (400) may comprise a third driving part (420) disposed facing a lower side of the second driving part (320).

The circuit board (410) may comprise an FPCB (Flexible Printed Circuit Board). The circuit board (410) may be disposed between the third driving part (420) and the base (500). Meanwhile, the circuit board (410) may supply electric power to the third driving part (320). Meanwhile, the circuit board (410) may supply electric power to the third driving part (420). In addition, the circuit board (410) may supply electric power to the first driving part (220) or to the second driving part (320). According to an exemplary embodiment, the circuit board (410) may supply electric power to the first driving part (220) through the lateral support member (630) and the upper support member (610).

According to an exemplary embodiment of the present disclosure, the circuit board (410) may comprise a through-hole (411) and a terminal part (412). The circuit board (410) may comprise a through-hole (411) through which the light that has passed through the lens module passes. The circuit board (410) may comprise a terminal part (412) curved to be exposed to external space. The terminal part (412) may be connected to an external electric power source, thereby the circuit board (410) may be supplied with electric power.

The third driving part (420) may move the second driving part (320) through electromagnetic interaction. The third driving part (420) may comprise a coil. When an electric power is applied to the coil of the third driving part (420), the second driving part (220) and the housing (310) fixed with the second driving part (220) may be integrally moved by interaction with the second driving part (320). The third driving part (420) may be mounted on the circuit board (410) or may be electrically connected to the circuit board (410).

Meanwhile, the third driving part (420) may comprise a through-hole (421) for the light of the lens module to pass through. In addition, in consideration of miniaturization (to lower the height in z-axis direction that is the optical axis direction), the third driving part (420) may be formed as an FP (Fine Pattern) coil to be arranged or mounted on the circuit board (410). According to an exemplary embodiment of the present disclosure, the FP (Fine Pattern) coil may be so formed as to minimize interaction with the second sensor part (720) disposed at a lower side. The FP coil may be so formed as not to overlap with the second sensor part (720) in a rostro-caudal direction. In this case, the FP coils facing each other may be asymmetrical to each other.

The base (500) may support the second mover (300). A printed circuit board may be disposed on a lower side of the base (500). The base (500) may comprise a through-hole (510) formed at a position corresponding to that of the lens coupling part (211) of the bobbin (210). The base (500) may perform as a sensor holder to protect the image sensor. Meanwhile, an infrared ray filter may be coupled to the through hole (510) of the base (500). Alternatively, the infrared ray filter may be coupled to a separate holder arranged at a lower portion of the base (500).

According to an exemplary embodiment of the present disclosure, the base (500) may comprise foreign material collecting part (520) for collecting foreign materials introduced in the cover member (100). The foreign material collecting part (520) may be disposed on an upper surface of the base (500) and may comprise an adhesive material, such that foreign material collecting part (520) can collect foreign materials in the inner space, where the foreign materials may be generated by the cover member (100) and the base (500).

The base (500) may further comprise a sensor installation part (530) to which the second sensor part (720) is coupled. That is, the second sensor part (720) may be installed at the sensor installation part (530). Here, the second sensor part (720) may sense movement of the housing (310) in horizontal directions by detecting the second driving part (320) coupled to the housing (310). According to an exemplary embodiment of the present disclosure, two of the sensor installation parts (530) may be provided. The second sensor part (720) may be disposed at each of the two sensor installation parts (530). In this case, the second sensor part (720) may be so arranged as to sense movement of the housing (310) in both of x-axis and y-axis directions.

The support member (600) may connect at least any two of the first mover (200), the second mover (300), and the base (500). The support member (600) may elastically connect at least any two of the first mover (200), the second mover (300), and the base (500), such that a relative movement between each component may be available. That is, the support member (600) may be provided as an elastic member.

According to an exemplary embodiment of the present disclosure, the support member (600) may comprise an upper support member (610), a lower support member (620), and a lateral support member (630). In addition, the support member (600) may further comprise a conductive member (not illustrated) provided separately from the support member (630) to electrically connect each of the support members.

According to an exemplary embodiment of the present disclosure, the upper support member (610) may comprise an outer part (611), an inner part (612), and a connecting part (613). The upper elastic member (610) may comprise the outer part (611) coupled to the housing (310), the inner part (612) coupled to the bobbin (210), and the connecting part (613) elastically connecting the outer part (611) and the inner part (612).

The upper support member (610) may be connected to an upper portion of the driver (200) and to an upper portion of the second mover (300). In particular, the upper support member (610) may be coupled to an upper portion of the bobbin (210) and to an upper portion of the housing (310). The inner part (612) of the upper support member (610) may be coupled to the upper coupling part (213) of the bobbin (210), and the outer part (611) of the upper support member (610) may be coupled to the upper coupling part (313) of the housing (310).

The inner part (612) may be so formed in a shape corresponding to at least a portion of the upper stopper (900) as to accommodate at least a portion of the upper stopper (900). The inner part (612) may be so formed as to cover three continuously arranged lateral surfaces of the upper stopper (900).

According to an exemplary embodiment of the present disclosure, the upper support member (610) may comprise a pair of upper support members (610a, 601b). That is, the upper support member (610) may comprise a first upper support member (610a) and a second upper support member (610b). Each of the first upper support member (610a) and the second support member (610b) may be connected to each of a pair of lead cables provided as coils of the first driving part (220) to supply electric power. Meanwhile, the pair of upper elastic members (610a, 610b) may be connected to the circuit board (410) through the lateral support member (630). Thereby, the pair of the upper support member (610) may provide electric power supplied from the circuit board (410) to the first driving part (220).

According to an exemplary embodiment of the present disclosure, the lower support member (620) may comprise an outer part (621), an inner part (622), and a connecting part (623). The lower elastic member (620) may comprise the outer part (621) coupled to the housing (310), the inner part (622) coupled to the bobbin (210), and the connecting part (623) elastically connecting the outer part (621) and the inner part (622).

The lower support member (620) may be connected to a lower portion of the first mover (200) and to a lower portion of the second mover (300). In particular, the lower support member (620) may be coupled to a lower portion of the bobbin (210) and to a lower portion of the housing (310). The inner part (622) of the lower support member (620) may be coupled to the lower coupling part of the bobbin (210), and the outer part (621) of the lower support member (620) may be coupled to the lower coupling part of the housing (310).

An end of the lateral support member (630) may be coupled to the stator (400) and/or to the base (500), and another end of the lateral support member (630) may be coupled to the upper support member (610) or to the second mover (300). According to an exemplary embodiment of the present disclosure, an end of the lateral support member (630) may be couple to the stator (400), and another end of the lateral support member (630) may be coupled to the housing (310). Alternatively, an end of the lateral support member (630) may be couple to the base (500), and another end of the lateral support member (630) may be coupled to the upper support member (610). In this wise, the lateral support member (630) may elastically support the second mover (300), such that the second mover (300) can be tilted or moved in horizontal directions.

The lateral support member (630) may comprise a plurality of leaf springs. Alternatively, the lateral support member (630) may comprise a plurality of wires. According to an exemplary embodiment of the present disclosure, a number of the lateral support member (630) may be determined in consideration of symmetricity. According to an exemplary embodiment of the present disclosure, the lateral support member (630) may comprise four leaf springs each arranged on four lateral surfaces of the housing (310).

According to an exemplary embodiment of the present disclosure, the lateral support member (630) or the upper support member (610) may comprise an impact absorbing part. The impact absorbing part may be provided at at least one of the lateral support member (630) and the upper support member (610). The impact absorbing part may be a separate member such as a damper. Alternatively, the impact absorbing part may be implemented through shape modification in some part of at least one of the lateral support member (630) and the upper support member (610).

The sensor part (not illustrated) may be used for AF (Auto Focus) feedback and/or OIS (Optical Image stabilization) feedback. That is, the sensing part may sense a position or movement of at least one of the first mover (200) and the second mover (300).

According to an exemplary embodiment of the present disclosure, the sensor part may comprise a first sensor part (not illustrated) and the second sensor part (720). The first sensor part may sense a rostro-caudal flow of the bobbin (210) relatively with respect to the housing (310) to provide information for AF feedback. The second sensor part (720) may sense tilt or horizontal movement of the second mover (300) to provide information for OIS feedback.

The first sensor part may be disposed at the first mover (200). The first sensor part may be disposed at the bobbin (210). The first sensor part may be fixed by being inserted in the sensor guide groove (not illustrated) formed on an outer circumferential surface of the bobbin (210). The first sensor part may sense a position or movement of the bobbin (210). Alternatively, the first sensor part may sense a position of the second driving part (320) mounted on the housing (310). According to an exemplary embodiment, the first sensor part may comprise a Hall sensor. In this case, the first sensor part may sense magnetic force generated from the second driving part (320) to detect relative displacement between the bobbin (210) and the housing (310).

The second sensor part (720) may be disposed at the stator (400). The second sensor part (720) may be disposed at an upper surface or a lower surface of the circuit board (410). According to an exemplary embodiment of the present disclosure, the second sensor part (720) may be arranged on a lower surface of the circuit board (410) to be disposed at the sensor installation part (530) formed on the base (500). According to an exemplary embodiment of the present disclosure, the second sensor part (720) may comprise a Hall sensor. In this case, the second sensor part (720) may sense magnetic field to sense relative movement of the second mover (300) with respect to the stator (400). According to an exemplary embodiment of the present disclosure, two second sensor parts (720) may be provided so as to sense movement of the second mover (300) in all of x-axis and y-axis directions. Meanwhile, the second sensor part (720) may be disposed to avoid overlapping with the FP coil of the third driving part (420) in a rostro-caudal direction.

The lens driving device according to an exemplary embodiment of the present disclosure may further comprise a lower stopper (810) and a lower stopper accommodation part (820).

The lower stopper (810) may be disposed at the bobbin (210). The lower stopper (810) may be protruded from an outer lateral surface of the bobbin (210). The lower stopper (810) may be outwardly protruded from the outer lateral surface of the bobbin (210). At least a portion of the lower stopper (810) may be overlap with the housing (310) in a vertical direction. The lower stopper (810) may be extended outwardly from an outer circumferential surface of the bobbin (210). At least a portion of the lower stopper (810) may overlap with the housing (310) in a vertical direction.

The lower stopper (810) may be extended outwardly from the bobbin (210) and may selectively contact the housing (310) to limit movement of the bobbin (210) in a downward direction. That is, the lower stopper (810) may be selectively accommodated in the lower stopper accommodation part (820) to limit movement of the bobbin (210) in a downward direction.

The lower stopper (810) may be provided in a number of four. Here, the four lower stoppers (810) may be arranged symmetrical to each other based on a center of the bobbin (210). Among the four lower stoppers (810), a virtual line connecting two lower stoppers (810) facing each other in a diagonal direction may pass through a center of the bobbin (210). In this wise, two virtual lines connecting each two of the four lower stoppers (810) may orthogonally meet at the center of the bobbin (210). When the lower stoppers (810) are symmetrically arranged, the impacts applied on the lower stopper (810) and the lower stopper accommodation part (820) may be evenly dispersed when the lower stopper (810) is accommodated in the lower stopper accommodation part (820). The lower stopper (810) may be formed at a position corresponding to that of the corner part (318) of the housing (310). The lower stopper (810) may be respectively formed at each position corresponding to four corner parts of the housing (310).

The lower stopper (810) may comprise an inclined surface (815) disposed at a portion of an upper surface of the lower stopper (810) corresponding to a position of the connecting part (613). A portion of the inclined surface (815) may overlap with the connecting part (613) of the upper support member (610) in a vertical direction. The inclined surface (815) may prevent a phenomenon that the connecting part (623) contacts the lower stopper (810) due to displacement of the bobbin (210). Alternatively, the inclined surface (815) may prevent a phenomenon that the connecting part (613) is damaged by pressure, even if the connecting part (613) contacts an upper surface of the lower stopper (810) due to displacement of the bobbin (210).

The lower stopper (810) may not overlap with the connecting part (613, 623) in a vertical direction. Through such structure, the lower stopper (810) may avoid interference with the connecting part (613, 623) in spite of rostro-caudal movement of the bobbin (210).

The lower stopper (810) may comprise a first surface (811), a second surface (812), and a third surface (813). That is, the lower stopper (810) may comprise a first surface (811), a third surface (812) adjacent to the first surface (811), and a third surface (813) adjacent to the first surface (811), and a second surface (812) adjacent to the third surface (813).

Here, the first surface (811) may face the first lateral surface (316) of the housing (310), and the third surface (813) may face the corner part (318), and the second surface (812) may face the second lateral surface (317). Each of the first surface (811), the third surface (813), and the second surface (812) may be parallel to an inner lateral surface of the lower stopper accommodation part (820). More particularly, the first surface (811) may face a first facing surface (821) of the lower stopper accommodation part (820), the third surface (813) may face the third facing surface (823), and the second surface (812) may face the second facing surface (822).

An angel formed by the first surface (811) and the third surface (813) may be an obtuse angle. Here, an angle of inner sides of the first surface (811) and the third surface (813) may be an obtuse angle. An angle formed by the first surface (811) and the third surface (813) may be 130°~140°. According to an exemplary embodiment of the present disclosure, the angle formed by the first surface (811) and the third surface (813) may be 135°. Here, among angles formed by the first surface (811) and the third surface (813), the angle not exceeding 180° may be 135°, and the other angle may be 225°. The angle formed by the first surface (811) and the third surface (813) may correspond to the angle formed by the second surface (812) and the third surface (813). An angle formed by a first virtual surface extended from the first surface (811) and a second virtual surface extended from the second surface (812) may be 90°.

The lower stopper accommodation part (820) may be disposed at the housing (310). The lower stopper accommodation part (820) may be disposed on an upper surface of the housing (310). The lower stopper accommodation part (820) may be concavely formed from an upper surface to downward. The lower stopper accommodation part (820) may take a shape where a portion of the upper surface of the housing (310) is downwardly recessed. The lower stopper accommodation part (820) may correspond to the lower stopper (810) such that the lower stopper (810) can be selectively accommodated.

The lower stopper accommodation part (820) may selectively contact the lower stopper (810) depending on movement of the bobbin (210) to limit movable distance of the bobbin (210) with respect to the housing (310). The lower stopper accommodation part (820) may limit the lower limit of movement of the bobbin (210) with respect to the housing (310) in the optical axis direction. The lower stopper accommodation part (820) may selectively support the lower stopper (810) to provide the lower limit of movement of the bobbin (210) with respect to the housing (310).

The lower stopper accommodation part (820) may comprise a first facing surface (821) facing the first surface (811), a second facing surface (822) facing the second surface (812), and a third facing surface (823) facing the third surface (813). Here, a distance between the first surface (811) and the first facing surface (821), a distance between the second surface (812) and the second facing surface (822), and a distance between the third surface (813) and the third facing surface (823) may correspond to one another.

Through such structure, movement of the bobbin (210) may be limited to an extent of a distance corresponding to an x-axis direction viewed from the first surface (811), a y-axis direction viewed from the second surface (812), a diagonal direction viewed from the third surface (813). According to an exemplary embodiment of the present disclosure, a distance between the first surface (811) and the first facing surface (821), a distance between the second surface (812) and the second facing surface (822), and a distance between the third surface (813) and the third facing surface (823) may be, for example, 70~90 μm.

In addition, a distance between the first surface (811) and the first facing surface (821), a distance between the second surface (812) and the second facing surface (822), and a distance between the third surface (813) and the third facing surface (823) may be 80 μm. In the present exemplary embodiment, the movement is limited to an extent of the same distance with respect to the x-axis direction, the y-axis direction, and the diagonal direction. Therefore, the same amount of impulse may be generated in all of the x-axis direction, the y-axis direction, and the diagonal direction.

However, when the angle formed by the first surface (811) and the third surface (813) and the angle formed by the second surface (812) and the third surface (813) are 90°, the bobbin (210) may be further moved in the x-axis direction and the y-axis direction by a square root of 2 than in the diagonal direction, the bobbin (210) may strike the housing (310) with larger accelerating force. Therefore, when the bobbin (210) strikes the housing (310) in the x-axis and the y-axis direction, the impulse may become larger.

The lens driving device according to an exemplary embodiment of the present disclosure may further comprise an upper stopper (900).

The upper stopper (900) may be extended upwardly from the bobbin (210). The upper stopper (900) may selectively contact the cover member (100) to limit upward movement of the bobbin (210). The upper stopper (900) may be dispose at the outermost side of the bobbin (210). Through such structure, the tilt maximum angle may be minimized even when the tilt is induced in the bobbin (210). However, the position of the upper stopper (900) is not limited to the outermost side of the bobbin (210). Therefore, the upper stopper (900) may be disposed at any position that can maintain the tilt maximum angle of the bobbin (210) within a permissible range.

At least a portion of the upper stopper (900) may be disposed at the lower stopper (810). That is, the lower stopper (810) may be formed by being outwardly protruded from an outer circumferential surface of the bobbin (210), and the upper stopper (900) may be disposed at an upper part of the lower stopper (810). Through such structure, the upper stopper (900) may be disposed at the outermost side of the bobbin (210).

At least a portion of the upper stopper (900) may overlap with the housing in a vertical direction. The upper stopper (900) is required to be disposed outer than the outer circumferential surface of the bobbin (210), in order for the upper stopper (900) formed on the bobbin (210) to overlap with the housing (310) in the vertical direction. Therefore in this case, the tilt maximum angle of the bobbin (210) may be maintained within the permissible range.

The upper stopper (900) may take a hexahedral shape, and an upper surface (905) of the upper stopper (900) may be parallel to the upper plate (101) of the cover member (100). In this case, when the bobbin (210) is moved upwardly by an external impact to strike the cover member (100), the upper surface (905) of the upper stopper (900) may surface-contact an inner surface of the upper plate (101) of the cover member (100) to disperse the impacts. However, the present disclosure is not limited hereto. The upper surface (905) of the upper stopper (900) may be formed being inclined. In particular, the upper surface (905) of the upper stopper (900) may be formed being inclined, such that the upper surface (905) of the upper stopper (900) may surface-contact an inner surface of the upper plate (101) of the cover member (100), when the bobbin (210) is tilted.

The upper stopper (900) may be disposed at a side of the corner part (318) of the housing (310). The upper stopper (900) may be disposed on a virtual line connecting a center of the bobbin (210) with the corner part (318). The upper stopper (900) may be disposed on a third surface (218) of the bobbin (210) facing the corner part (318) of the housing (310). That is, the upper stopper (900) may be arranged in the diagonal direction, not in the x-axis direction or the y-axis direction, to be disposed being further spaced apart from the center of the bobbin (210).

The upper stopper (900) may be disposed at each of four corner parts. The upper stopper (900) disposed at each of four corner parts may be spaced apart from the center of the bobbin (210) at a distance corresponding to each other. That is, the upper stopper (900) may be provided in a plural number to be disposed symmetrically from the center of the bobbin (210).

The upper stopper (900) may be disposed between the inner part (612) and the connecting part (613). That is, the upper stopper (900) may be disposed outer than the inner part (612). Here, a portion of the inner part (612) may be omitted. Meanwhile, according to an exemplary embodiment of the present disclosure, the upper stopper (900) may take a hexahedral shape. The inner part (612) may be so formed to cover three continuous lateral surfaces of the upper stopper (900) in a shape of the hexahedron.

According to an exemplary embodiment of the present disclosure, the upper stopper (900) may comprise an inner lateral surface (901), an outer lateral surface (902), a first lateral surface (903) disposed between the inner lateral surface (901) and the outer lateral surface (902), and a second lateral surface (904) facing the first lateral surface (903). Here, the inner part (612) may be so disposed to cover the inner lateral surface (901), the first lateral surface (903), and the second lateral surface (904).

The upper stopper (900) may be disposed between a plurality of upper coupling parts (213). Two upper coupling parts (213) may be disposed at both sides based on the upper stopper (900). Two of the upper coupling parts (213) may be spaced apart from the upper stopper (900) at a distance corresponding to each other, and may be symmetrically disposed to each other. As an example, at the bobbin (210), the upper stopper (900) may be provided in a number of four, and the upper coupling part (213) may be provided in a number of eight. However, the present disclosure is not limited hereto.

Figure 5:
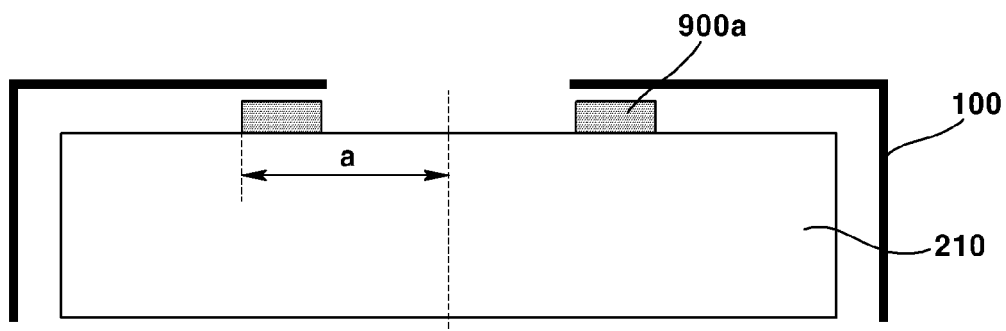
FIGS. 5 and 6 are views comparatively illustrating a comparative example (a) and a lens driving device (b) according to an exemplary embodiment of the present disclosure.
Figure 5:
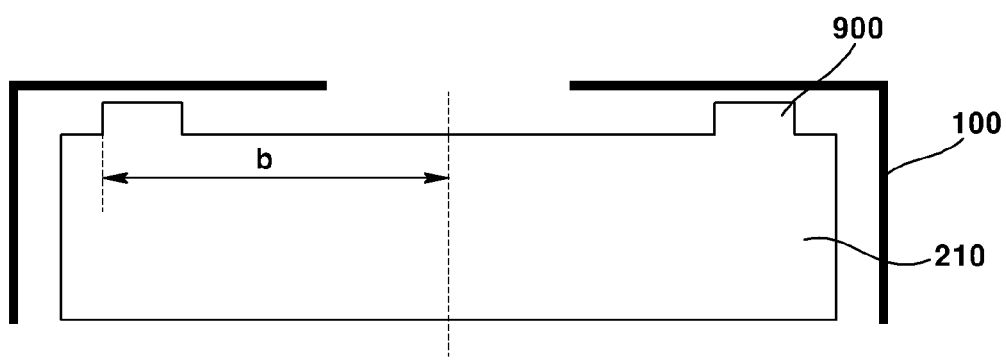

FIGS. 5(*a*) and 6(*a*) are illustrating comparative examples, and FIGS. 5(*b*) and 6(*b*) are illustrating the lens driving device according to an exemplary embodiment of the present disclosure.

Figure 6:
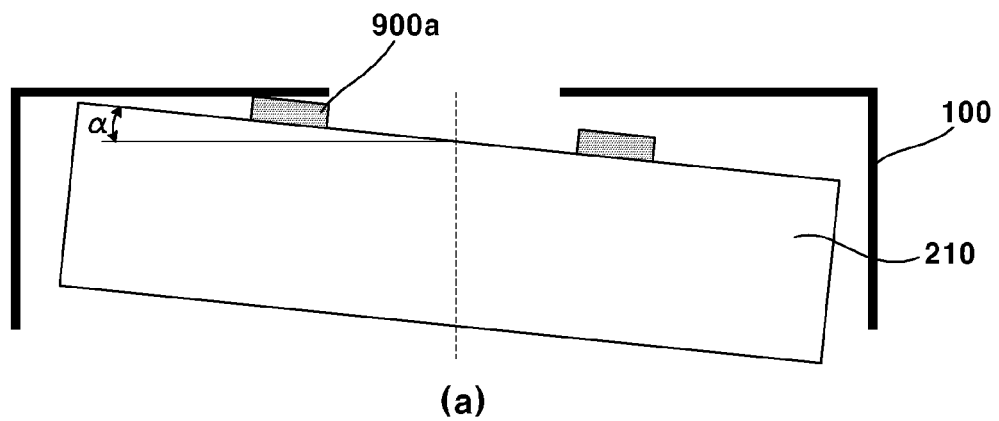
Figure 6:
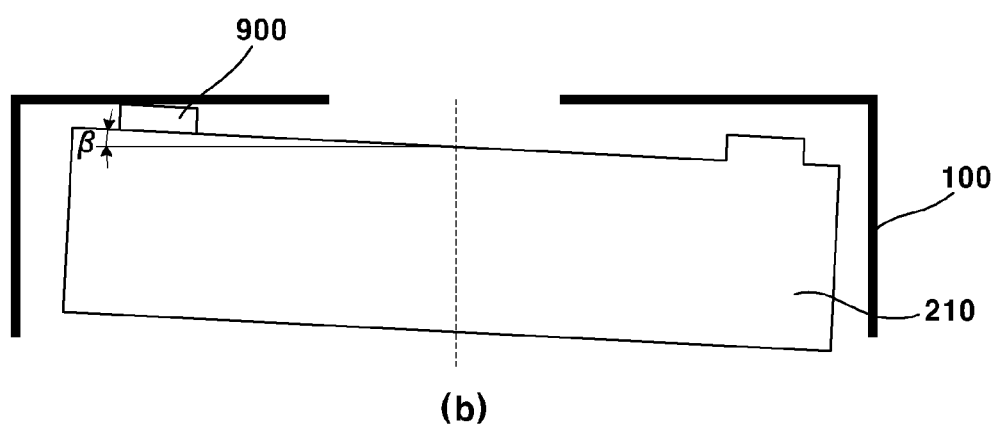

Referring FIGS. 5 and 6, the upper stopper (900*a*) in the comparative example is disposed at an inner side in comparison to the upper stopper (900) of the lens driving device according to an exemplary embodiment of the present disclosure. That is, the upper stopper (900) of the lens driving device according to the present exemplary embodiment of the present disclosure may be disposed outer than the upper stopper (900*a*) of the comparative example.

There is not a difference between the comparative example (a) and the present exemplary embodiment (b) in FIG. 5 where the bobbin (210) is disposed at a regular position with respect to the cover member (100). However, it can be ascertained that the angle ($\alpha$) of the bobbin (210) being tiled is different from the angle ($\beta$) of the bobbin (210) being tiled in FIG. 6 where the bobbin (210) is tilted to the maximum extent with respect to the cover member (100). More particularly, it can be ascertained that the maximum tilt angle ($\alpha$) of the bobbin (210) in the comparative example (a) is wider than the maximum tilt angle ($\beta$) of the bobbin (210) in the present exemplary embodiment (b).

That is, the maximum tilt angle ($\beta$) of the bobbin (210) in the present exemplary embodiment (b) is narrower than the maximum tilt angle ($\alpha$) of the comparative example (a). Therefore, in the present exemplary embodiment, the amount impulse applied to the bobbin (210) and/or the cover member (100) may be reduced, even when the tilted bobbin (210) strikes the cover member (100), comparing to the comparative example (a).

Hereinafter, an operation of the camera module according to an exemplary embodiment of the camera module will be described.

At first, an auto focus function of the camera module according to the present exemplary embodiment will be described. When an electric power is supplied to the coil of the first driving part (220), the first driving part (220) may be moved with respect to the second driving part (320) by electromagnetic interaction between magnets of the first driving part (220) and the second driving part (320). Here, the bobbin (210) coupled with the first driving part (220) may be integrally moved with the first driving part (220).

That is, the bobbin (210) internally coupled with the lens module may be moved with respect to the housing (310) in a rostro-caudal direction. Such movement of the bobbin (210) may cause the lens module to move closer to or farther from the image sensor. Thereby, the focus control for the object may be performed.

Meanwhile, an auto focus feedback may be applied in order to implement more precise auto focus control of the camera module according to the present exemplary embodiment of the present disclosure. The first sensor installed at the bobbin (210) and provided as a Hall sensor may sense magnetic field of the second driving part (320) provided as a magnet fixed to the housing (310).

Meanwhile, when the bobbin (210) is relatively moved with respect to the housing (310), the amount of magnetic field sensed by the first sensor may be changed. In this wise, the first sensor may sense a travel amount or a position of the bobbin (210) in the z-axis direction, and may transmit the sensed value to the controller.

The controller may determine, based on the received sensed value, whether the bobbin (210) will be additionally moved or not. This process may be generated in real-time. Therefore, the auto focus function of the camera module according to the present exemplary embodiment can be performed more precisely through the auto focus feedback.

Here, the optical image stabilization function of the camera module according to the present exemplary embodiment of the present disclosure will be described. When electric power is applied to the third driving part (420), the second driving part (320) may be moved with respect to the third driving part (420) by electromagnetic interaction between the third driving part (420) and the second driving part (320).

Here, the housing (310) coupled with the second driving part (320) may be moved integrally with the second driving part (320). That is, the housing (310) may be moved with respect to the base (500) in horizontal directions.

Meanwhile, the housing (310) may be induced to tilt with respect to the base (500). Such movement of the housing (310) may cause the lens module to move with respect to the image sensor in a direction parallel to a direction where the image sensor is positioned. Thereby, the optical image stabilization function may be performed.

Meanwhile, an optical image stabilization feedback may be applied in order to implement more precise optical image stabilization control of the camera module according to the present exemplary embodiment of the present disclosure. A pair of the second sensors installed at the base (500) and provided as a Hall sensor may sense magnetic field of the second driving part (320) provided as a magnet fixed to the housing (310).

Meanwhile, when the housing (310) is relatively moved with respect to the base (500), the amount of magnetic field sensed by the second sensor (720) may be changed. In this wise, the second sensor (720) may sense a travel amount or a position of the housing (310) in horizontal (x-axis and y-axis) directions, and may transmit the sensed value to the controller.

The controller may determine, based on the received sensed value, whether the housing (310) will be additionally moved or not. This process may be generated in real-time. Therefore, the optical image stabilization function of the camera module according to the present exemplary embodiment of the present disclosure can be performed more precisely through the optical image stabilization feedback.

In the above, all elements composing an exemplary embodiment of the present disclosure have been described as being integrally combined or operating in combination, however, the present disclosure is not limited hereto. That is, within the scope of purpose of the present disclosure, at least one of all such elements may be selectively combined to operate. In addition, the terms such as "include", "comprise" or "have" are state that there may be in existence of features, numbers, steps, functions, elements, components described herein, or compositions thereof. Therefore, they shall not be understood as to exclude the possibility of existence or addition of one or more other features, numbers, steps, functions, elements, components described herein, or compositions thereof.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

In the above, exemplary embodiments of the present disclosure have been described. However, these embodiments are merely examples and do not limit the present invention, so that persons who skilled in the art of the present disclosure may easily transform and modify within the limit of the technical spirit of the present disclosure. For example, each of the components shown in detail in the embodiments of the present invention may be implemented in transformation. In addition, the differences relating these transformations and modifications shall be regarded to be included in the scope of the present disclosure as defined in the attached claims of the present disclosure and the equivalents thereof.

The invention claimed is:

1. A lens driving device, comprising:
    a housing;
    a bobbin disposed in the housing;
    a magnet disposed on the housing;
    a first coil disposed on an outer lateral surface of the bobbin and facing the magnet; and
    a first support member coupled to the housing and the bobbin,
    wherein the bobbin comprises a first protrusion part protruding from the outer lateral surface of the bobbin, and a second protrusion part protruding from an upper surface of the first protrusion part,
    wherein at least a portion of the first protrusion part of the bobbin protrudes more than the first coil from the outer lateral surface of the bobbin,
    wherein the first support member is coupled to an upper surface of the bobbin,
    wherein the first support member comprises an inner part coupled to the bobbin, an outer part coupled to the housing, and a connecting part connecting the inner part and the outer part, and
    wherein the first protrusion part does not overlap with the connecting part of the first support member in a direction of an optical axis.

2. A camera module, comprising:
    a printed circuit board;
    an image sensor disposed on the printed circuit board;
    the lens driving device of claim 1 disposed above the printed circuit board; and
    a lens coupled to the bobbin of the lens driving device and disposed at a position corresponding to the image sensor.

3. An optical apparatus, comprising:
    a main body;
    the camera module of claim 2, wherein the camera module is disposed on the main body, and configured to photograph an image of a subject; and
    a display unit disposed on a surface of the main body and configured to output an image photographed by the camera module.

4. The lens driving device of claim 1, wherein the first protrusion part of the bobbin is disposed at a position upper than a position of the first coil.

5. The lens driving device of claim 1; wherein the first protrusion part of the bobbin is overlapped with the magnet in the direction of the optical axis.

6. The lens driving device of claim 5, wherein the first protrusion part of the bobbin is contacted with the housing when the bobbin downwardly moves along the optical axis.

7. The lens driving device of claim 1, comprising:
a cover member covering the housing and comprising an upper plate and a lateral plate extending from the upper plate,
wherein the second protrusion part of the bobbin is overlapped with the upper plate of the cover member in the direction of the optical axis.

8. The lens driving device of claim 1, wherein the housing comprises a hole and a groove,
wherein at least a portion of the first protrusion part of the bobbin is disposed in the groove of the housing,
wherein the groove of the housing comprises a first surface; a second surface and a third surface disposed between the first surface and the second surface,
wherein an angle between the first surface of the groove of the housing and the third surface of the groove of the housing is an obtuse angle;
wherein an angle between the second surface of the groove of the housing and the third surface of the groove of the housing is the obtuse angle, and
wherein the first protrusion part of the bobbin comprises a shape corresponding to a shape of the groove of the housing.

9. The lens driving device of claim 8, wherein the first protrusion part of the bobbin comprises a first surface facing the first surface of the groove of the housing, a second surface facing the second surface of the groove of the housing, and a third surface facing the third surface of the groove of the housing,
wherein an angle between the first surface of the first protrusion part of the bobbin and the third surface of the first protrusion part of the bobbin is an obtuse angle,
wherein an angle between the second surface of the first protrusion part of the bobbin and the third surface of the first protrusion part of the bobbin is the obtuse angle, and
wherein the groove of the housing is recessed downward from an upper surface of the housing.

10. The lens driving device of claim 8, wherein a minimum distance between the first surface of the first protrusion part of the bobbin and the first surface of the groove of the housing is same as a minimum distance between the third surface of the first protrusion part of the bobbin and the third surface of the groove of the housing.

11. The lens driving device of claim 1, wherein the first protrusion part of the bobbin comprises four first protrusion parts, wherein the four first protrusion parts are symmetrically arranged based on the optical axis, and
wherein each of the four first protrusion parts is disposed at a position corresponding to each of four corners of the housing.

12. The lens driving device of claim 1,
wherein the inner part of the first support member comprises a hole,
wherein the bobbin comprises a third protrusion part protruding from an upper surface of the bobbin, and
wherein the third protrusion part of the bobbin is inserted into the hole of the inner part of the first support member.

13. The lens driving device of claim 12, wherein the third protrusion part of the bobbin comprises a plurality of third protrusion parts, and
wherein the first protrusion part of the bobbin is disposed between the plurality of third protrusion parts of the bobbin.

14. The lens driving device of claim 12, comprising:
a base disposed below the housing,
a lateral support member comprising one end coupled to the first support member and another end coupled to the base, and
wherein at least a portion of the lateral support member is overlapped with the housing in a direction perpendicular of the optical axis.

15. The lens driving device of claim 14, wherein the lateral support member elastically supports the housing when the housing is moved in the direction perpendicular of the optical axis.

16. A lens driving device, comprising:
a first mover comprising a bobbin and a first coil disposed on an outer lateral surface of the bobbin;
a second mover comprising a housing and a magnet disposed on the housing;
a base disposed below the housing;
a circuit board disposed on the base and comprising a second coil facing the magnet; and
a first support member coupled to the housing and the bobbin,
wherein the bobbin comprises a first protrusion part protruding from the outer lateral surface of the bobbin, and a second protrusion part protruding from an upper surface of the first protrusion part,
wherein at least a portion of the first protrusion part of the bobbin protrudes more than the first coil from the outer lateral surface of the bobbin,
wherein the first support member is coupled to an upper surface of the bobbin,
wherein the first support member comprises an inner part coupled to the bobbin, an outer part coupled to the housing, and a connecting part connecting the inner part and the outer part, and
wherein the first protrusion part is disposed between the inner part and the connecting part.

17. The lens driving device of claim 16, wherein the first protrusion part of the bobbin is overlapped with the second mover in the direction of the optical axis.

18. The lens driving device of claim 17, wherein the first protrusion part of the bobbin is contacted with the second mover when the bobbin downwardly moves along the optical axis.

19. The lens driving device of claim 16, comprising:
a cover member covering the second mover and comprising an upper plate and a lateral plate extending from the upper plate,
wherein the second protrusion part of the bobbin is overlapped with the upper plate of the cover member in the direction of the optical axis.

20. A lens driving device, comprising:
a cover member comprising an upper plate and a lateral plate extending from the upper plate;
a bobbin disposed in the cover member;
a coil disposed on the bobbin;
a magnet disposed between the coil and the lateral plate of the cover member and facing the coil; and
a first support member coupled to an upper surface of the bobbin,
wherein the bobbin comprises a first protrusion part protruding from an outer lateral surface of the bobbin, and a second protrusion part protruding from an upper surface of the first protrusion part, wherein the first protrusion part of the bobbin is disposed at a position higher than a position of the coil, wherein the first support member comprises an inner part coupled to the bobbin, an outer part disposed outside the inner part, and a connecting part connecting the inner part and the outer part, and wherein the first protrusion part is disposed at an inner side of the connecting part of the first support member.

* * * * *